US008069776B2

(12) United States Patent
Glucksman et al.

(10) Patent No.: US 8,069,776 B2
(45) Date of Patent: *Dec. 6, 2011

(54) TOASTER

(75) Inventors: Dov Z. Glucksman, Danvers, MA (US); David Normand Belanger, Peabody, MA (US)

(73) Assignee: Appliance Development Corporation, Danvers, MA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/246,157

(22) Filed: Oct. 6, 2008

(65) Prior Publication Data

US 2011/0179953 A1 Jul. 28, 2011

Related U.S. Application Data

(60) Provisional application No. 61/040,950, filed on Mar. 31, 2008.

(51) Int. Cl.
*A47J 37/08* (2006.01)

(52) U.S. Cl. ............... 99/391; 99/390; 99/389; 99/385

(58) Field of Classification Search ................ 99/385, 99/389, 390, 391, 392
See application file for complete search history.

(56) References Cited

U.S. PATENT DOCUMENTS

| | | | |
|---|---|---|---|
| 1,624,893 A | 4/1927 | Marsden | |
| 2,262,498 A * | 11/1941 | Holm-Hansen | 99/341 |
| 2,488,097 A * | 11/1949 | Page | 99/389 |
| 3,660,637 A | 5/1972 | Grove | |
| 4,346,651 A * | 8/1982 | Schickedanz | 99/392 |
| 4,987,827 A * | 1/1991 | Marquez | 99/331 |
| 5,584,231 A * | 12/1996 | DeLeon | 99/332 |
| 6,279,466 B1 * | 8/2001 | Gort-Barten | 99/389 |
| 6,921,887 B2 | 7/2005 | Back et al. | |
| 7,189,945 B2 | 3/2007 | Starr et al. | |
| 7,472,644 B2 * | 1/2009 | Friel, Sr. | 99/327 |

* cited by examiner

*Primary Examiner* — Reginald L Alexander
(74) *Attorney, Agent, or Firm* — George A. Herbster

(57) ABSTRACT

A toaster in which spaced, vertically oriented heating assemblies are nested within a cover that pivots between open and closed positions. In the open position, an consumer can add food slices to or remove toasted food slices from baskets in the toaster remotely from the heating assemblies. When the cover closes, the heating assemblies pivot to be positioned on both sides of the baskets. When energized, the heating assemblies toast the food slices.

17 Claims, 10 Drawing Sheets

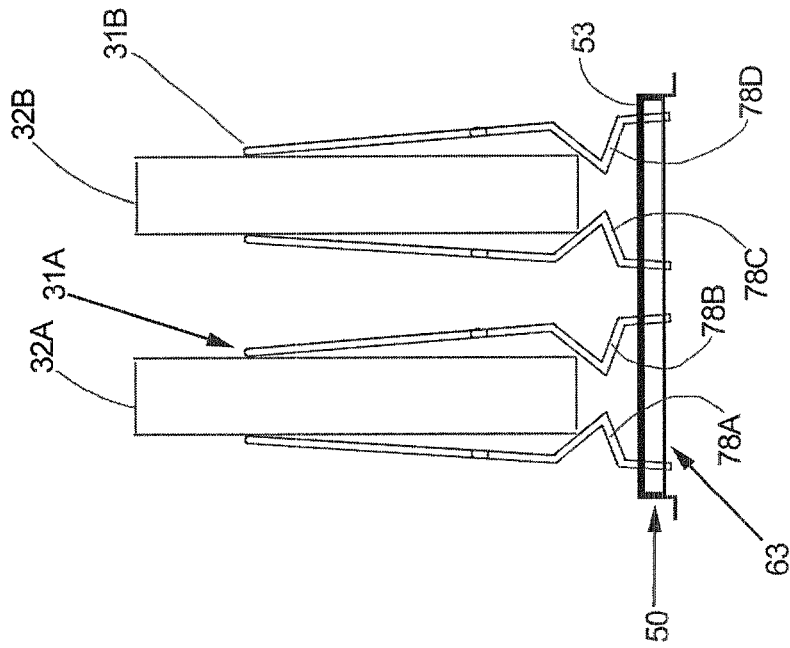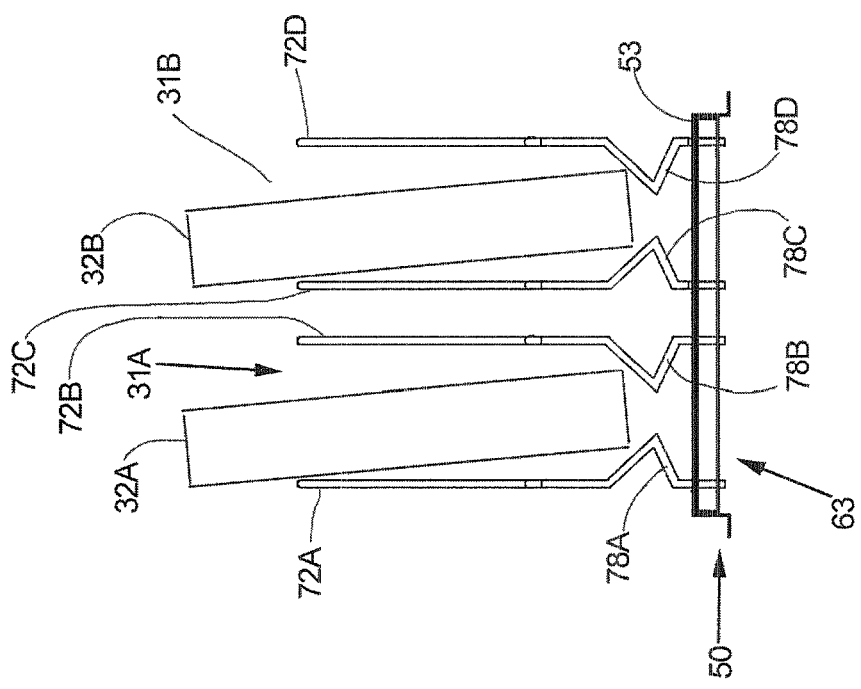

TOASTER

CROSS REFERENCE TO RELATED PROVISIONAL APPLICATION

This application is entitled to the benefit of U.S. Patent Application Ser. No. 61/040,950 filed Mar. 31, 2008 for an Improved Toaster.

BACKGROUND OF THE INVENTION

1. Field of the Invention

This invention generally relates to electric apparatus for toasting food, and more specifically to a toaster that overcomes many of the problems of current toasters.

2. Description of Related Art

Toasters have existed for many years and often embody a basic construction in which a housing essentially surrounds the toasting mechanism. Elongated openings through the top of the housing provide access to internal basket assemblies. The basket assemblies typically support the bread slices or the like so their outer surfaces are essentially parallel to and proximate heater plates within the toaster. An consumer manipulates a slider or other control that establishes a time interval for toasting the bread slices. After the bread slices are placed into the basket assemblies, the consumer depresses a mechanical lever or performs some similar function. The basket assemblies move to a latched lower position compressing one or more return springs. This energizes heating elements on each side of the bread slice. A bimetallic switch or similar device, being adjustable by the above-mentioned button or slider, releases the latch after the toasted bread slice has reached the desired level of darkness. The compressed springs elevate the basket assemblies and the toasted bread slices so the consumer can grasp the top portion of the slice. Toasters with this basic construction have been popular for a number of years.

However, removal of toast from conventional toasters is not always easy. Small toast slices are a particular problem if, after toasting, they lie below the top. If one reaches inside through the elongated opening to retrieve such a toast slice, there is a risk of burning a finger on adjacent hot surfaces. Using a utensil, such as a fork, is likely to damage the heating elements. If an consumer tries to remove a food slice from a basket assembly while the heaters are energized, there is a danger of electric shock and even electrocution.

Often these toasters do not toast food slices uniformly, as evidenced by varying shades that often appear across the food slice surface. The top portion of the food slice is usually darker and drier than the bottom portion due to its exposure to rising hot air. Such toasters are also inefficient. Infrared radiation is the primary toasting property. However, the heating elements radiate a certain percentage of their energy into the room through the elongated openings through the top. There is also a loss of heat through the slots due to convection. As a result considerable energy is wasted, which lowers the overall operating efficiency for the toaster.

More recently it has become desirable for toasters to receive other foodstuffs, like bagels, flatbread, Panini sandwiches and the like. In the following discussion the phrase "food slice" is intended to designate all such foodstuffs as might be inserted into a toaster. In U.S. Pat. No. 7,189,945 (2007) to Starr et al. a toaster includes a chassis that defines a cavity with spaced, parallel heating elements. The chassis has a door that closes an open end. When the door opens, in one embodiment, it pulls a carriage with food slice basket assemblies from the cavity and chassis. An consumer loads food slices in the basket assemblies and then closes the door. When the door closes, the heating elements are energized to toast the food slices. In one proposed embodiment, the toaster includes a motor to facilitate the opening and closing of the door.

The Starr et al. patent states that the disclosed apparatus provides even toasting of a variety of food slices by controlling the loss of heat and moisture from the enclosed heating chamber. However, it also appears each of the embodiments include structures that increase manufacturing costs and introduce potential reliability issues. For example, in the first and third embodiments the use of sliding doors and a sliding carriage requires the assembly of a large number of components which add to manufacturing costs. A sliding carriage also acts as a crumb tray, but during operation crumbs may slide off the tray and jam the carriage.

An consumer of each of any one of the first, second and third embodiments will probably close the door against the force of a door-opening spring. The consumer must block the back of the toaster either by abutting it against a vertical surface or by grasping the back edge or cover with one hand. Otherwise it is likely that the toaster will slide along a countertop or other supporting surface. After repeated toasting cycles heat may build up at the top back corner of the toaster. Consequently, the toaster must include structures that assure this buildup does not produce a potential for burning the consumer's hand that grasps the top back corner. In addition, this required action for manual operation differs from the one-handed action used for conventional toasters; this may make the toaster less desirable to use. A suggested alternative is to provide a motor drive to operate the door, but this also increase expense and the potential for reliability problems.

Many consumers want to store their toasters on counter tops characterized by limited counter space. Prior art toasters often require significantly more counter space than the space associated with food slices being toasted and the heating elements. Consequently, toasters are stored in cabinets or the like that are not as convenient as a countertop.

What is needed is a toaster that is compact, has low manufacturing costs, controls heat and moisture loss for uniform toasting, is easy to use and is reliable. Such a toaster should deliver the finished toast at a position that minimizes the potential for injury by inadvertent contact with heating elements or any other hot surfaces. Finally, the toaster should operate with minimal energy requirements.

SUMMARY

Therefore, it is an object of this invention to provide a toaster that minimizes the likelihood for injury to the consumer.

Another object of this invention is to provide a toaster that is intuitive to operate.

Still another object of this invention is to provide a toaster characterized by increased operating efficiencies.

Yet another object of this invention is to provide a toaster of a compact size.

Still another object of this invention is to provide a toaster that can be produced with minimum manufacturing costs.

In accordance with one aspect of this invention, a toaster for toasting at least one food slice comprises a base including at least one toasting slot for receiving a food slice and a cover forming an internal cavity with a bottom facing opening. The base and cover are enabled to assume first and second spatial relationships. A plurality of spaced, substantially planar heating elements attach to the cover in the cavity to be offset from each of the at least one toasting slot. The cover, in the first spatial relationship, displaces the heating elements away from the toasting slots for clear access thereto. In the second spatial relationship, the cover positions a heating element on each side of the at least one toasting slot. In the second spatial relationship the base and cover form a closed volume about the at least one toasting slot for establishing a toasting environment.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 10A and 10B are cross sectional views taken along line 10-10 in FIG. 6 to illustrate the operation of the adjustable basket assemblies of FIGS. 7 and 8.

DESCRIPTION OF ILLUSTRATIVE EMBODIMENTS

Figure 1:
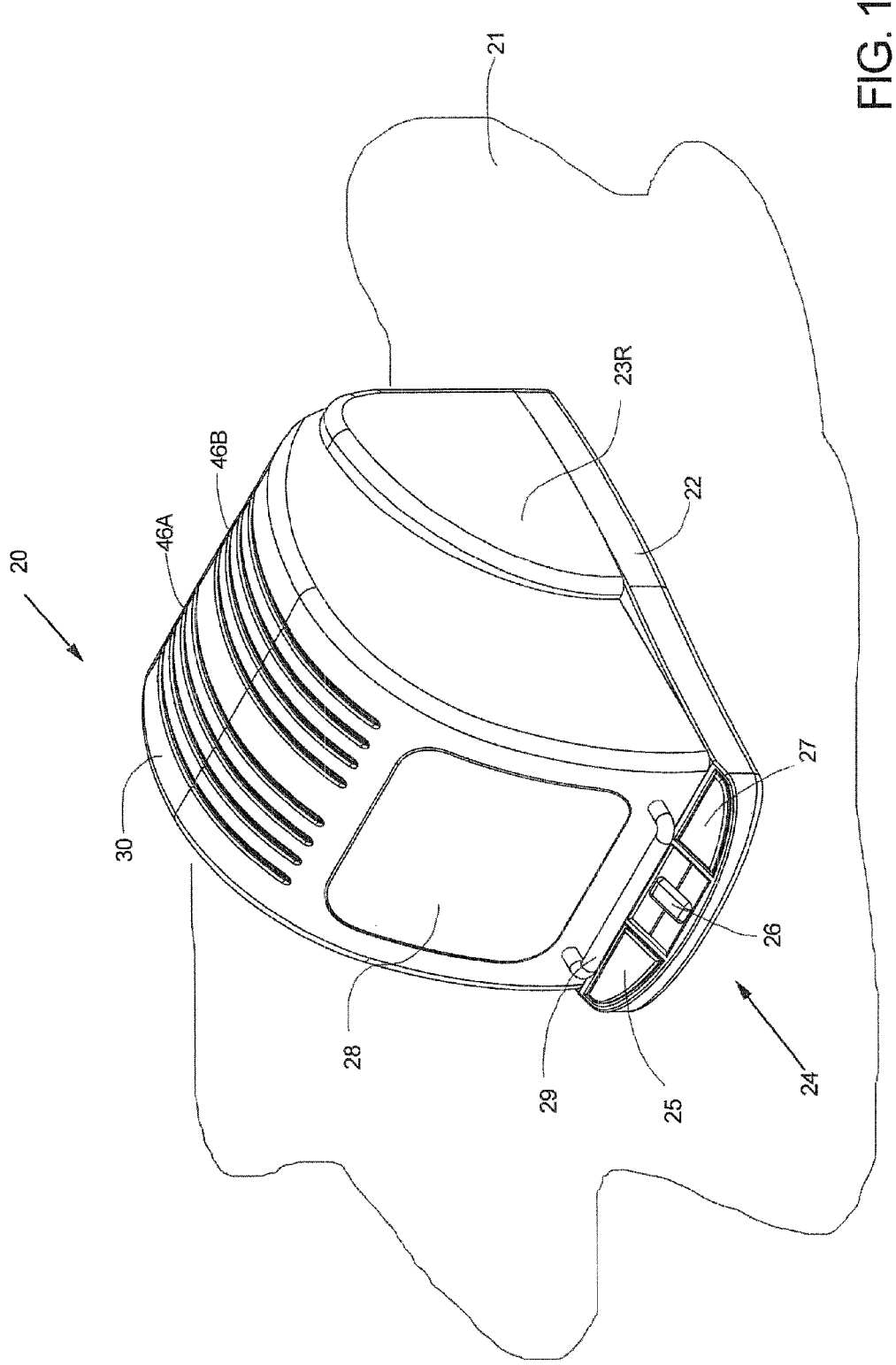
FIG. 1 is a perspective view of a toaster embodying this invention that is closed as it appears during operation and in storage.
Figure 2:
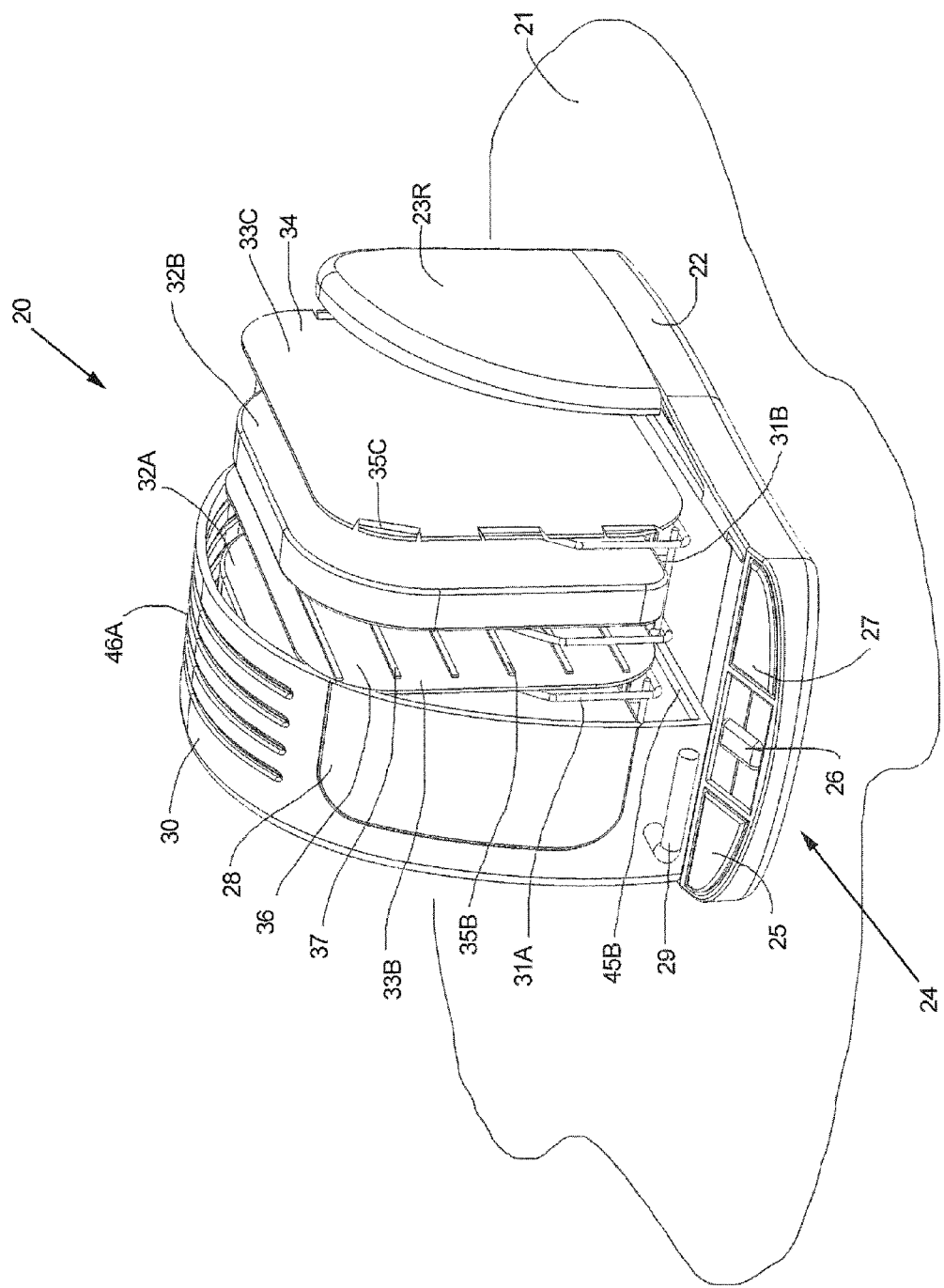
FIG. 2 depicts the perspective view of FIG. 1 with a portion of a toaster cover removed.

FIGS. 1 and 2 depict a toaster 20 that embodies this invention when it is closed and standing on a counter or other surface 21 as during storage or while toasting is underway. A base 22 contacts the surface 21 with feet (not shown, but known in the art). The base 22 includes a left side panel (not shown in FIG. 1) and a right side panel 23R (using left and right to designate corresponding sides when the toaster 20 is viewed from the front). The base 22 also includes a control panel 24 with components including a power switch 25, a control slider 26 and an open/cancel switch 27. As will become apparent, the function of each component is similar to functions performed in the prior art; any number of known techniques can be used to implement the control panel 24 with its components. A window 28 and a handle 29 are formed integrally with a cover 30. The window 28 provides visibility to the food slices during the toasting process. An consumer uses handle 29 to close the cover 30.

Figure 3:
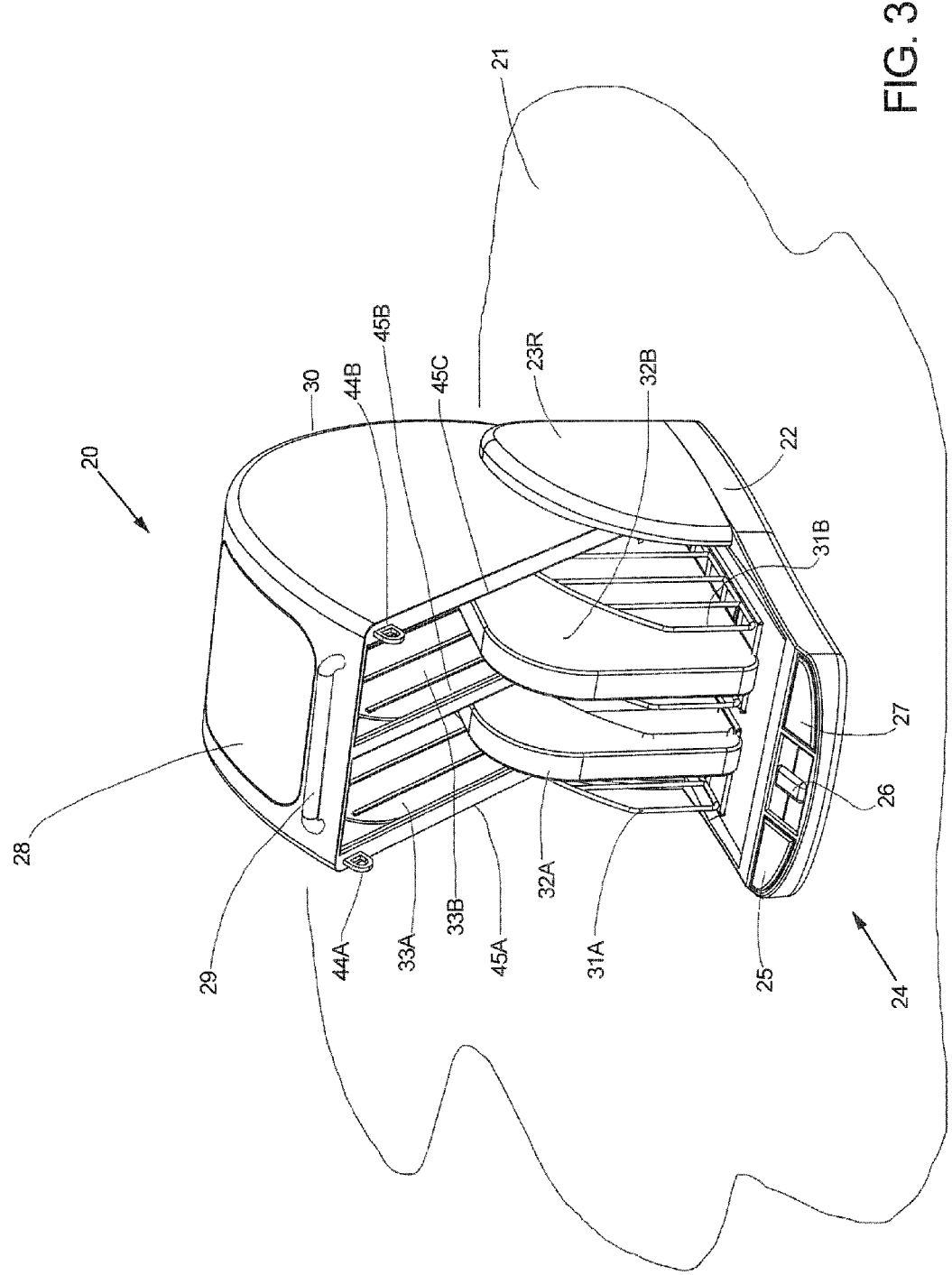
FIG. 3 is a perspective view of the toaster in FIG. 1 that is open as it appears for inserting a food slice for toasting and for removing a toasted food slice.
Figure 4:
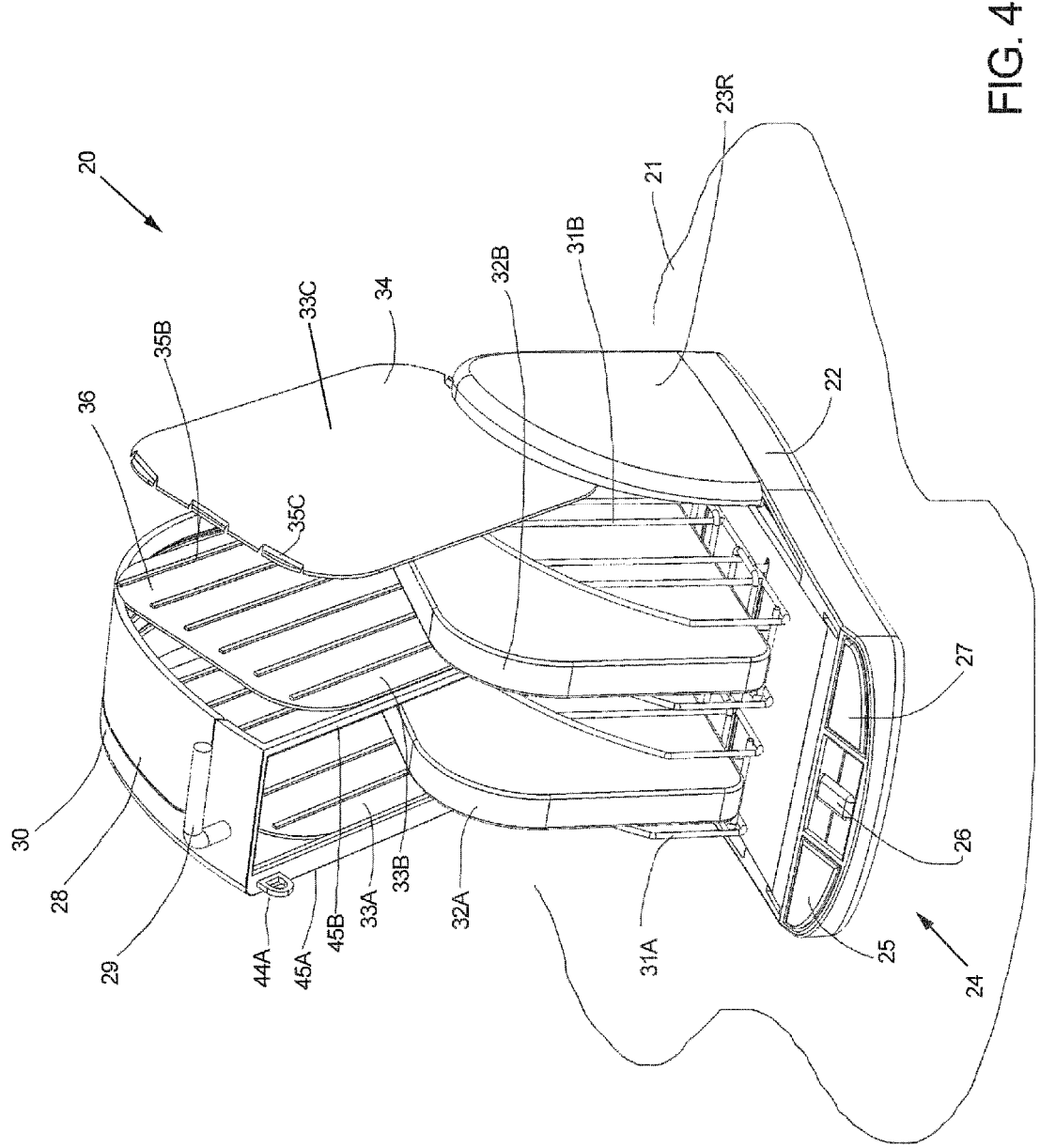
FIG. 4 depicts the perspective view of FIG. 3 with a portion of the toaster cover removed.

To open the toaster the consumer presses the open/cancel switch 27, the cover 30 pivots to an open position as shown in FIGS. 3 and 4. In open position of the cover 30, several components of the toaster become visible and accessible. As shown in FIGS. 3 and 4, for example, the base 22 supports two basket assemblies 31A and 31B for containing the food slices. These basket assemblies 31A and 31B are configured to maintain the food slices 32A and 32B in vertical, horizontally spaced orientations, or toasting slots respectively.

Still referring to FIGS. 3 and 4, the concave cover 30 forms a downwardly facing cavity with a bottom facing opening side and supports the horizontally spaced, substantially planar heating assemblies 33A through 33C within this cavity whereby the heating assemblies 33A through 33C move with the cover 30. Energy radiates from the sides of heating assemblies 33A and 33C that face the basket assemblies 31A and 31B. Energy radiates from both sides of heating assembly 33B. When the cover 30 closes to the position shown in FIGS. 1 and 2, the heating assemblies 33A, 33B and 33C, being offset form each basket assembly, pivot downwardly to lie in a toasting position thereby to direct radiant energy toward both sides of the two bread slices 32A and 32B when power is supplied.

In a preferred embodiment, the heating assemblies 33A and 33C have the same basic one-sided construction, but are oppositely facing within the cover 30. Looking at the heating assembly 33C, mica, or other heat-resistant insulating material forms a plate 34 that supports a run of heating wire 35C along parallel paths arranged to lie primarily on one side of the plate. The heating assembly 33B has a mica plate 36 that supports runs of heating wire 35B along parallel paths on both sides of the plate 36.

Referring to FIGS. 1 through 5, the base 22 and the cover 30 can assume one of two end spatial relationships. In this embodiment, the cover 30 pivots about a hinge including axles 40 supported by the side panels 23 as it moves between a first, or open, position shown in FIGS. 3 through 5 and a second, or closed position, of FIGS. 1 and 2 to establish a first spatial relationship. A spring 41 shown on the one side of the toaster 20 mounts concentrically with each axle 40. Ends 42 and 43 attach to the cover 30 and the corresponding one of the side panels 23. A similar spring is positioned on the other side of the toaster. These springs are oriented to be relaxed when the cover 30 is open. When an consumer uses the handle 29 to close the cover 30, the springs 41 come under tension as the cover 30 rotates to the closed position and establishes the second spatial relationship.

FIGS. 1 through 4 depict fixed basket assemblies, such as assemblies 32A and 32B that produce a fixed slot width. However, it now is more desirable to allow the sides of a basket assembly to move thereby to change a toasting slot width to accommodate slices of different thicknesses. Such adjustable sides are beneficial to the operation of the toaster, as they support the food slices, during the toasting period in a vertical position, parallel to, and equidistant from the face of the heating plates notwithstanding a range of thickness variations. They also pull away from the food slices to facilitate easy loading and unloading of the food slices.

FIGS. 5 through 10B depict one basket assembly embodiment that accommodates slices of different thicknesses and that is particularly adapted for use with this invention. Specifically, the basket assemblies, such as basket assembly 31B in FIGS. 5 and 6, mount to a support 50 attached to the base 22. As shown in FIGS. 5 through 8, the support 50 includes a fixed inverted u-shaped channel 51 having a pattern of eight apertures 52A-1 through 52D-2 formed through a horizontal panel 53. Legs and flanges on opposite sides of and integrally formed with the panel 53, like the leg 54 and flange 55, attach to the base 22 and space the panel 53 above the base 22 thereby to provide an open-ended elongated internal passage. The leg 54 includes an elongated horizontal slot 56 for allowing the passage of a pin 57. A second slot and pin are included on the other side of the support 50.

Figure 5:
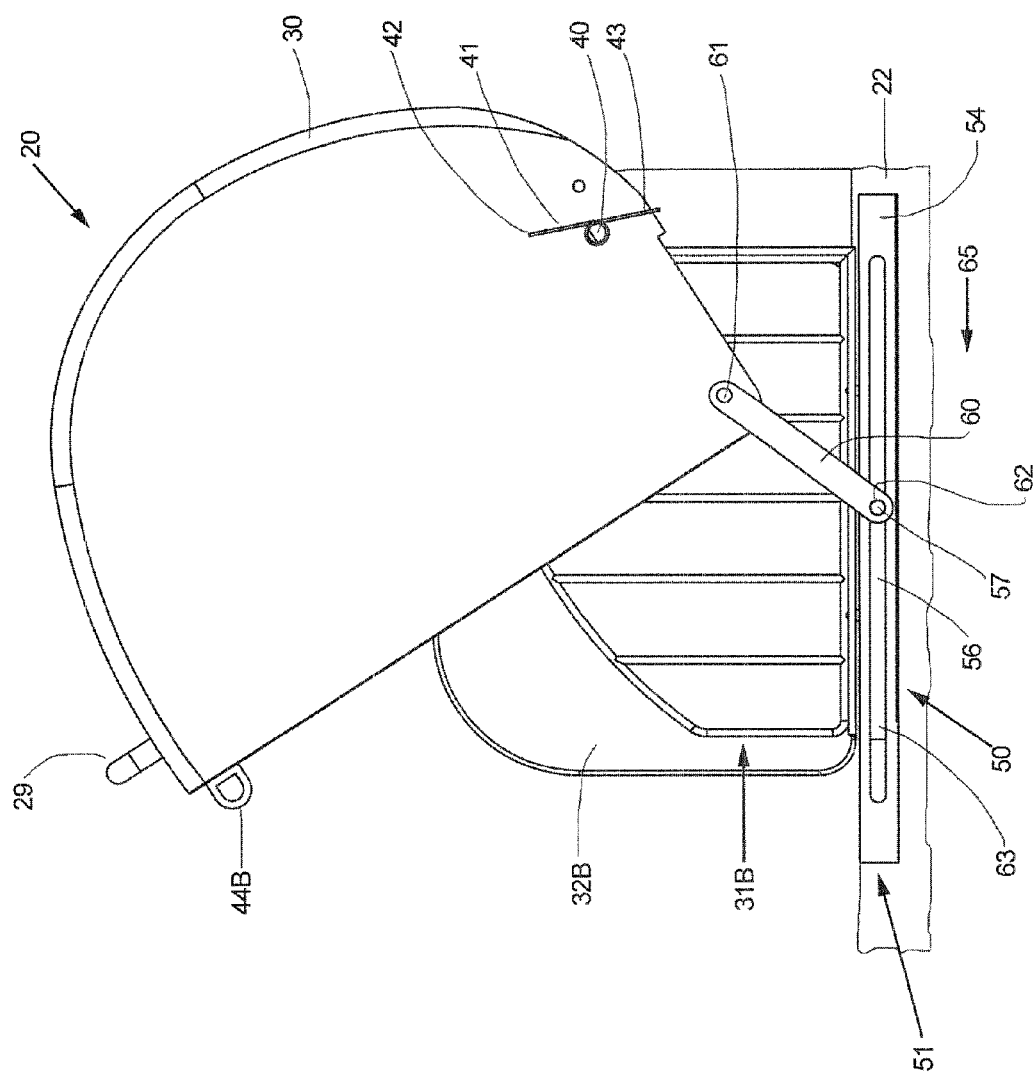
FIG. 5 is a side view of portions of the toaster mechanism in the open position of FIGS. 3 and 4.
Figure 6:
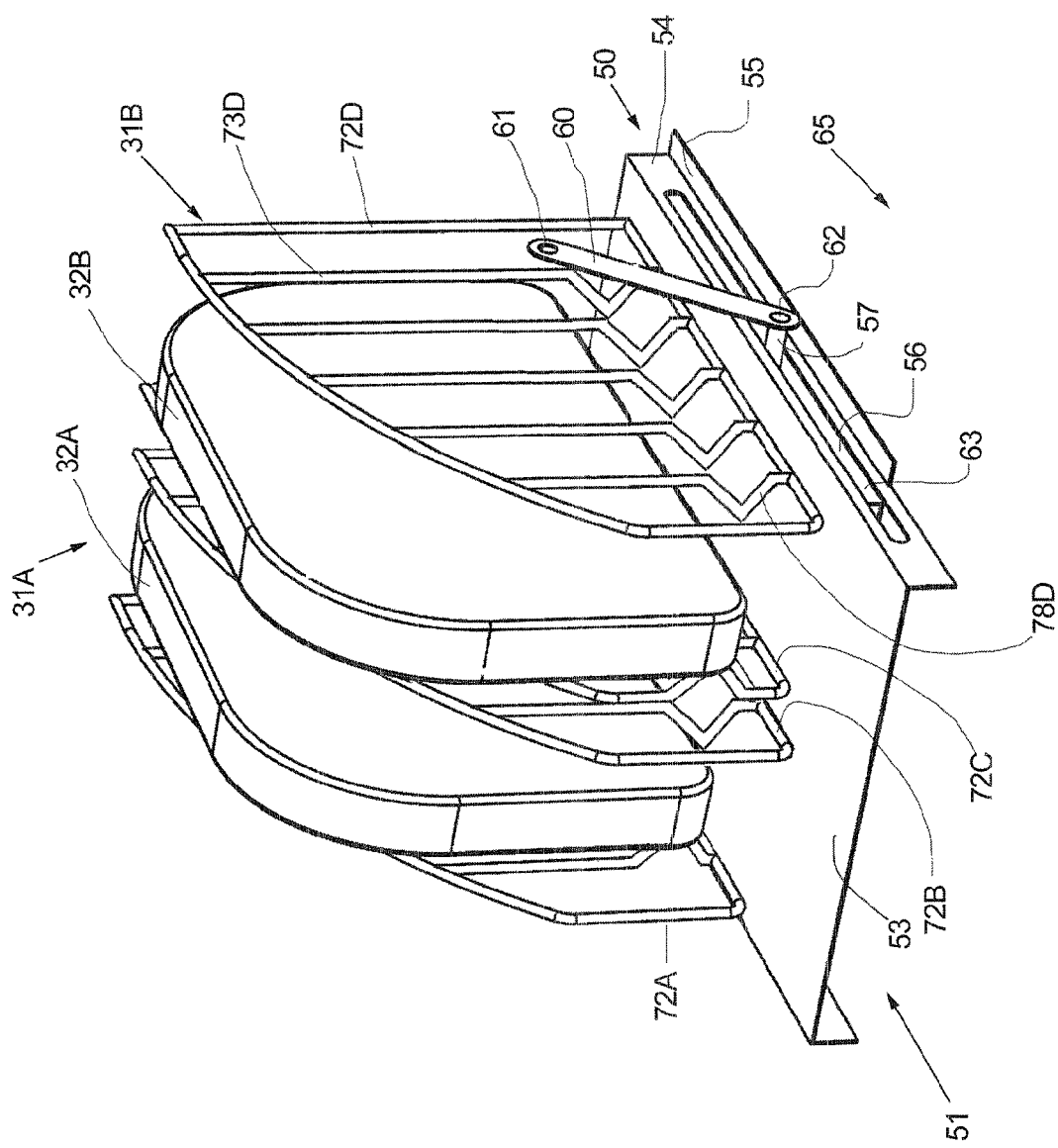
FIG. 6 depicts a perspective view of FIG. 3 of adjustable basket assemblies and their support platform removed.

Referring particularly to FIGS. 5 and 6, a link 60 attaches by means of a pivot 61 to the lower rear portion of the cover 30. A second pivot point 62 receives one end of the pin 57. The other end of the pin 57 attaches to a carriage 63 in a socket 64. Channel 51 is fixed to the base 22; however, the carriage 63 is free to slide within the space that the channel 51 defines; i.e., forward or extended as shown by an arrow 65 in FIG. 5 or rearward or retracted. When the cover 30 opens as shown in FIG. 5, the link 60 positions the pin 57 and the carriage 63 at a forward position. When the cover 30 closes, the pivot points 57 and 61 move to the rear and retract the carriage 63.

Figure 8:
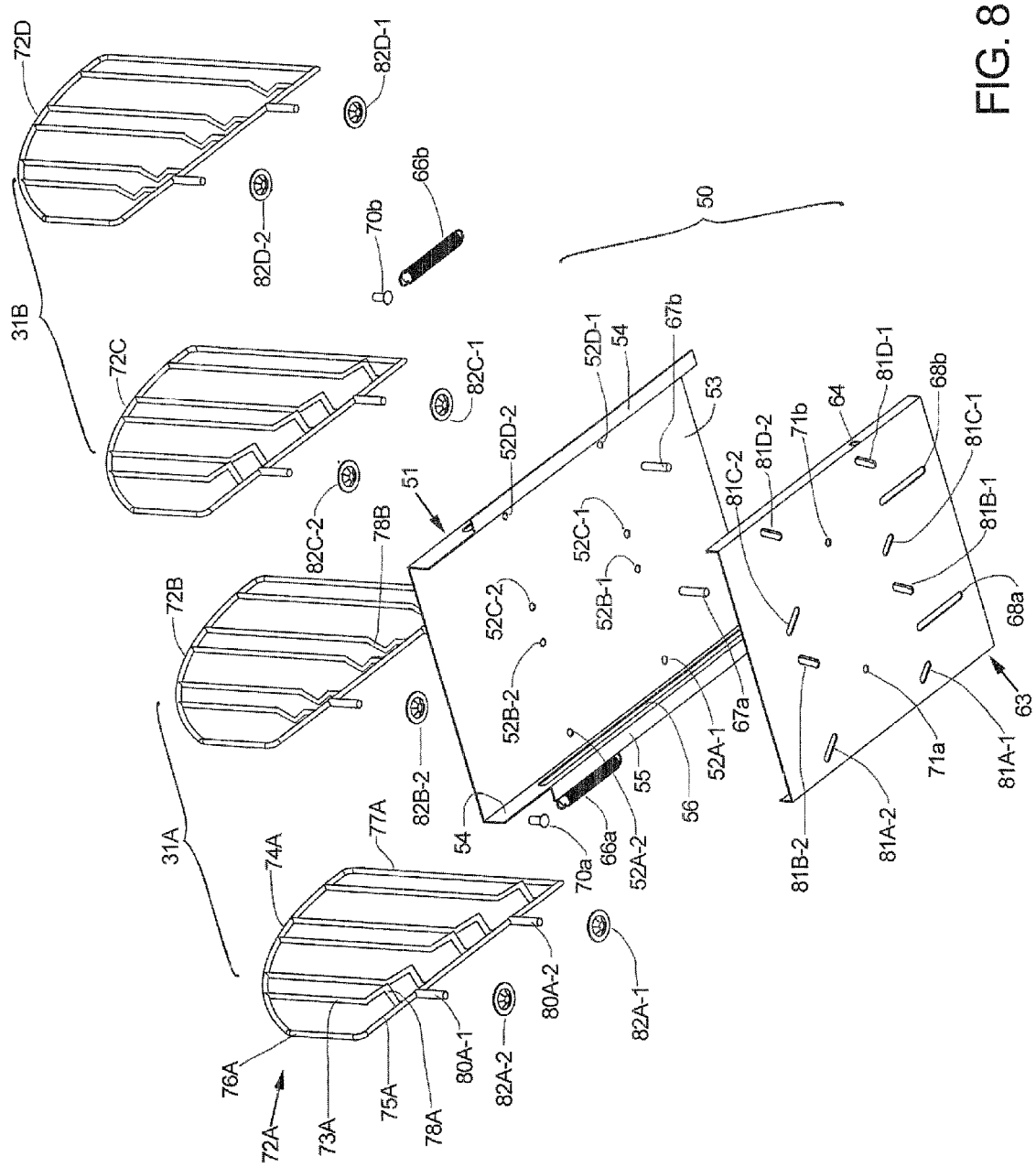
Figure 9:
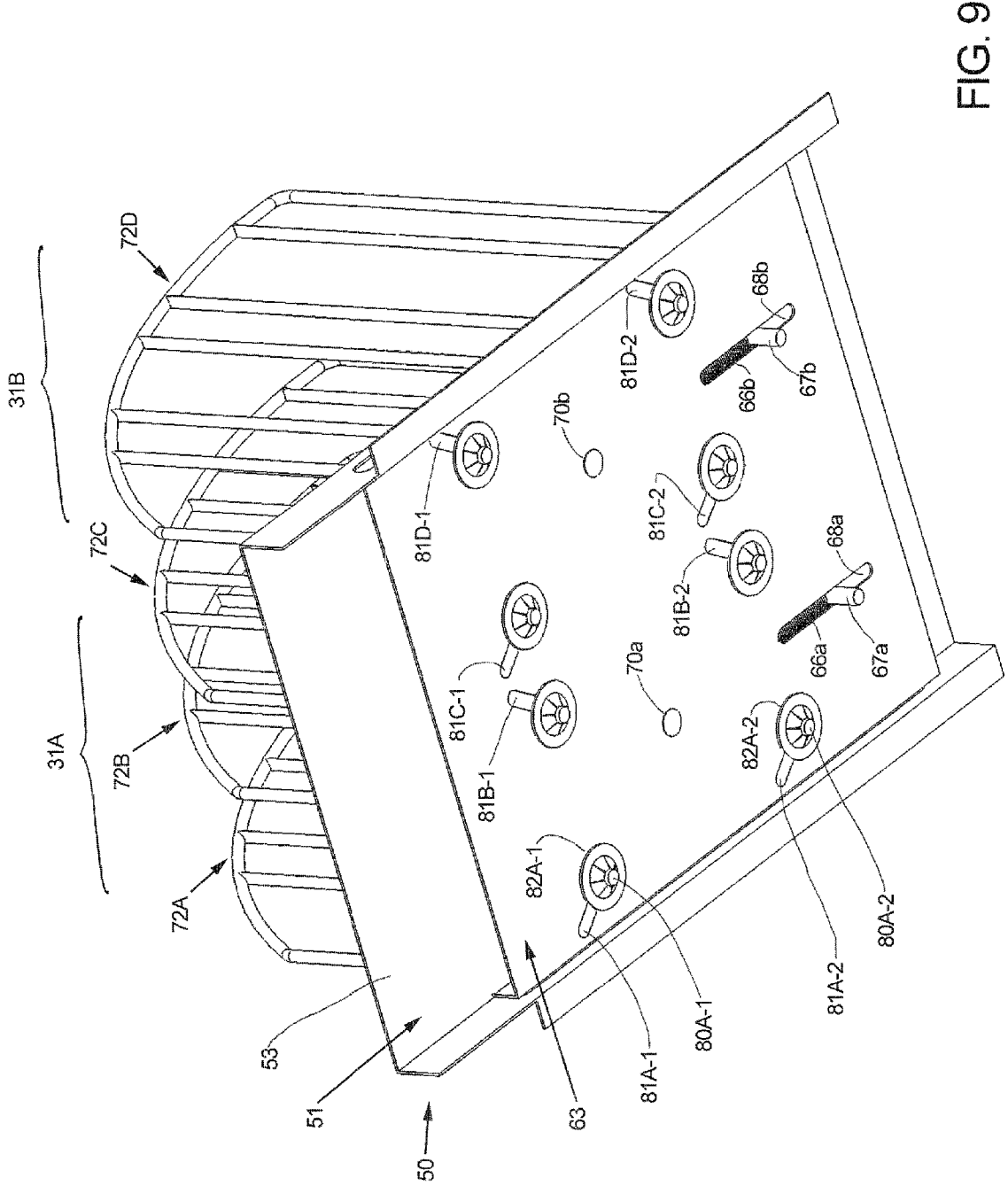
FIG. 9 is an isometric bottom view of the basket assembly in FIG. 6.

As shown in FIGS. 8 and 9, pins 67a and 67b that depend from the channel 51 are connected to rivets 70a and 70b that attach to the carriage 63 through apertures 71a and 71b, respectively by means of springs 66a and 66b. The springs 66a and 66b assist in retracting the carriage 63 as the cover 30 closes. In addition the pins 67A and 67B extend through slots 68a and 66b to constrain the carriage 63 to linear reciprocal motion relative to the support 50.

Figure 7:
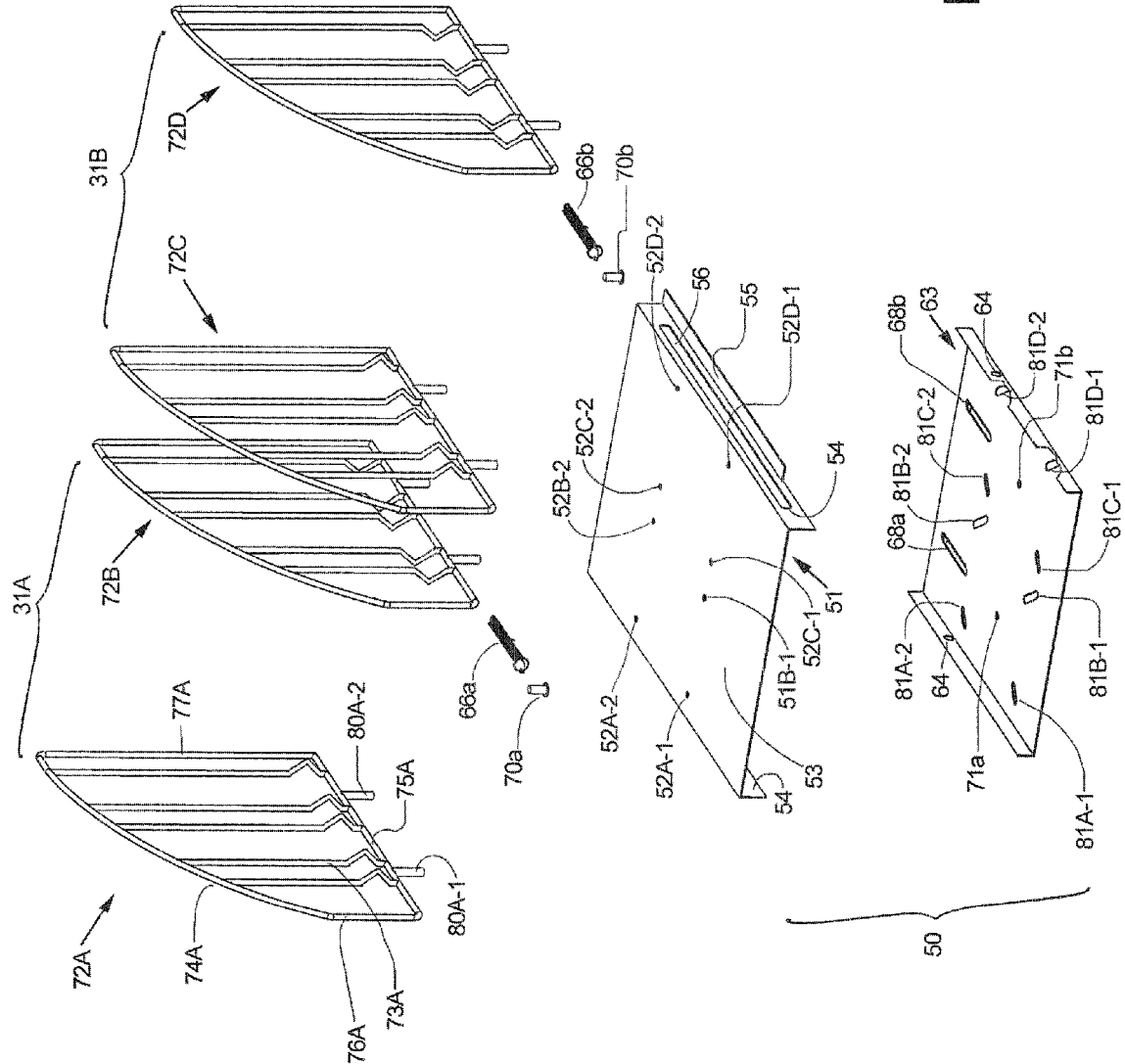
FIGS. 7 and 8 are exploded views in perspective taken from the top and bottom of the basket assembly in FIG. 6, respectively.

Now referring specifically to FIGS. 7 and 8, the two adjustable basket assemblies 31A and 31Bs consist of grid-like side panels 72A and 72B associated with basket assembly 31A and grid-like side panels 72C and 72D associated with basket assembly 31B. Side panels 72A and 72C are the same, and are the mirror image of side panels 72B and 72D. As they are similar in structure, the following description is directed to the side panel 72A.

Specifically, the side panel 72A comprises a set of spaced vertical steel wires 73A, a curved top wire 74A, a bottom wire 75A, a front wire 76A and back wire 77A. These wires are welded or otherwise joined to form grid-like panels shown in FIGS. 7 and 8. All these wires have portions in a common plane. However, the wires 73A have horizontally extending vee portions 78A formed therein. The counterfacing vee portions 78A on the panel 72A and 78B on the panel 72B form a bottom support for the food slice 32A.

Two vertical rods or pins 80A-1 and 80A-2 extend downwardly from the bottom wire to enable the side panels 72A through 72D to be mounted on the support 53. In FIGS. 7 and 8, for the side panel 72A the locating pins 80A-1 and 80A-2 extend downward from the bottom wire 75A. The side panel 72A is installed by inserting the two pins 80A-1 and 80A-2 through the apertures 52A-1 and 52A-2 in the panel 53 and through diagonal slots 81A-1 and 81A-2 in the carriage 63. In this embodiment, the apertures 52A-1 through 52D-2 are sized to provide a sliding fit for the pins 80A-1 through 80D-2. As shown in FIGS. 7 through 9, push nuts 82A and 82B slide over the pins 80A-1 and 80A-2 thereby to capture the components in a subassembly with the bottom wire 75A abutting the surface of the panel 53.

The slots 81A-1 through 81D-2 are organized into divergent sets, namely: sets 81A-1/B-1, 81A-2/B-2, 81C-1/D-1 and 82C-2/D-2 for side panels 72A, 72B, 72C and 72D, respectively. In each set the transverse dimension between the individual diagonal slots diverge from back to front.

With this structure, the panel 53 acts as a pivot plate and the carriage 63 acts as a cam plate. That is, when the cover 30 is in open position as shown in FIG. 5, the carriage 63 extends fully forward. As shown in FIG. 10A, the carriage 63 cams the distal end of the pins 80A-1 through 80D-2 inwardly. This causes the side panels 72A and 72B and the side panels 72C and 72D to pivot and diverge to provide a maximum spacing for receiving food slices 32A and 32B. The counterfacing vee portions 78A and 78B and vee portions 78C and 78D have sufficient depth or offset to provide a positive support for the food slices 32A and 32B, respectively.

As the cover 30 closes, the carriage 63 retracts. As shown in FIG. 10B, the carriage 63 cams the distal end of the pins 80A-1 through 80D-2 outwardly. This causes the side panels 72A and 72B and the side panels 72C and 72D to pivot toward each other to reduce the openings of the basket assemblies 31A and 31B. In this position the basket assemblies 31A and 31B support the food slices 32A and 32B in a vertical orientation. The counterfacing vee portions 78A and 78B and portions 78C and 78D continue to provide a positive support for the food slices 32A and 32B, respectively.

As will now be apparent, the basket assembly construction of FIGS. 7 through 10B is simple to manufacture with low-cost components. This simple, yet robust, construction provides the variable-width function in a reliable manner.

The foregoing structure of each of the figures provides a toaster that is easy and intuitive to use. An consumer connects the toaster 20 in an empty state to a power source and presses the OPEN/CANCEL button 27. This releases the latch (not shown) that engages latching eyes 44A and 44B that extend downwardly from the cover 30 at the front thereof to interact with the latching mechanism.

When the latching mechanism releases the latching eyes 44A and 44B, the cover 30 opens under the influence of the spring 41. The basket assemblies 31A and 31B advance to receive bread slices 32A and 32B. In the open position, a toaster constructed in accordance with this invention minimizes the chance of inadvertent injurious contact with the heating assemblies 33A through 33C as the heating assemblies are spaced from the baskets 31A and 31B and as the barriers 45A through 45C block direct contact with the ends of the heating assemblies 33A through 33C.

When the consumer closes the cover 30 using the handle 29, the latching mechanism locks the cover 30 in place against the restoring force exerted by the springs, such as the spring 41. As will be apparent, closing the cover 30 using the handle 29 is intuitive and requires the use of only one hand. Closing the cover 30 also requires very little force, as the weight of the lid minimizes the force required to overcome the force of the spring 41.

Now the food slides are supported for toasting. An electric interlock closes to allow power to reach the heating assemblies 33A through 33C. The consumer activates the power button 25 to initiate the toasting process. Alternatively closing of cover 30 could initiate the toasting process independently of the power button 25.

When the toasting process reaches a state determined by the setting of the control lever 26, the latch mechanism releases, the power terminates and the springs 41 drive the cover 30 to its open position. Alternatively, if the consumer, viewing the toast through the window 28, determines that no further toasting should occur, the open/cancel switch 27 can be activated thereby to release the latching mechanism manually. With the cover 30 open, the toaster 20 presents the toasted slices 32A and 32B as shown in FIG. 2.

As will now become apparent, the food slices 32A and 32B can be retrieved with minimal, if any, likelihood of contacting the heating assemblies 33A through 33C that remain nested in the cover 30. As will now be apparent, this construction provides a toaster that is intuitive to operate.

One of the objectives of this invention is to provide a toaster that operates with improved efficiency. As known, radiant energy emanates from the heating wires in all directions. Conventional toasters with top openings that are wider than the basket areas permit a portion of that radiant energy to escape.

In accordance with another aspect of this invention, the cover 30, as shown in FIGS. 1 and 2 includes two sets of narrow vents 46A and 46B that are aligned with the baskets 31A and 31B respectively. These closely spaced, narrow vents provide two advantages. First, the vents present an essentially opaque surface to the radiant energy that would otherwise escape. Each individual vent could also be provided with downwardly extending side panels (not shown) to further increase opacity. The inner surface of the cover can be finished to promote reflection of that radiant energy back into the interior of the cover. Further, the total area of each set of vents is less than the area of the opening of a conventional toaster, so the vents limit the escape of moisture and radiant and convective energy from the toaster. The vent sets 46A and 46B therefore reduce energy loss and improve operating efficiency. A nearly 50% reduction in power has been observed when comparing a toaster of this invention against conventional toasters with elongated openings.

It will also be apparent that a toaster constructed in accordance with this invention can have a small form factor that is, the cavity cover can be sized to encompass the basket assemblies such that the toaster is compact.

This invention has been disclosed in terms of certain embodiments. It will be apparent that many modifications can be made to the disclosed apparatus without departing from the invention. Therefore, it is the intent of this provisional application to cover all such variations and modifications as come within the true spirit and scope of this invention.

The invention claimed is:

1. A toaster for toasting at least one food slice comprising:
   A) a base including an integral basket assembly for receiving and positioning each of the at least one food slice in a toasting slot for being toasted,
   B) a cover forming an internal cavity with a bottom facing opening,
   C) hinge means attached to said cover and said base thereby to allow said cover to pivot between first and second spatial relationships with said base,
   D) latch means for retaining said cover in said second position thereby to maintain said second spatial relationship, and
   E) a plurality of spaced, substantially planar heating elements attached to said cover in said cavity to be offset from each of the at least one toasting slot, whereby said cover, upon assuming the first spatial relationship, displaces said heating elements away from said toasting slots for clear access thereto and whereby said cover, upon assuming the second spatial relationship, positions a heating element on each side of the at least one toasting slot, said base and cover, when in the second spatial relationship, forming a closed volume about said at least one toasting slot for establishing a toasting environment.

2. The toaster as recited in claim 1 additionally comprising means for biasing said cover to an open position thereby to establish the first spatial relationship.

3. The toaster as recited in claim 1 wherein each of said heating elements includes a planar support that carries a heating wire and wherein a rigid barrier overlies the edge of each planar support proximate the open side of said cover.

4. The toaster as recited in claim 1 wherein said cover includes vents aligned with the basket assemblies for controlling the moisture during the toasting process while reducing the escape of radiant and convective energy.

5. The toaster as recited in claim 1 wherein said each basket assembly includes spaced grid-like side panels for engaging each of the at least one food slice.

6. The toaster as recited in claim 5 wherein said basket assembly includes means for adjusting the spacing between said side panels to accommodate food slices of different thicknesses.

7. The toaster as recited in claim 5 wherein said basket assembly includes means responsive to the motion of said cover between said first and second spatial relationships for adjusting the spacing between the side panels to accommodate food slices of different thicknesses.

8. The toaster as recited in claim 7 wherein each of said side panels includes a pair of downwardly extending pins and said cover motion responsive adjusting means includes:
   i) a pivot plate attached to said base having a plurality of apertures for receiving said side panel pins for supporting each of said side panels for pivotal movement,
   ii) a cam plate positioned proximate said pivot plate and having means for applying to the ends of each said pins a force component perpendicular to said side panels, and
   iii) means attached to said cover for reciprocating said cam plate during the opening and closing of said cover thereby displacing the ends of said pins laterally and pivoting said side panels.

9. The toaster as recited in claim 8 additionally comprising means attached to said pivot and cam plates for biasing said carriage to a retracted position.

10. A toaster for toasting at least one food slice comprising:
    A) a base,
    B) a cover forming an internal cavity with a bottom facing opening,
    C) means for establishing first and second spatial relationships between said base and cover, said base including an integral basket assembly with spaced grid-like side panels for receiving and positioning each of the at least one food slice in a toasting slot for being toasted, said basket assembly additionally including:
       i) means for adjusting the spacing between said side panels to accommodate food slices of different thicknesses, and
       ii) means responsive to the motion of said cover between said first and second spatial relationships for adjusting the spacing between the side panels to accommodate food slices of different thicknesses, and
    D) a plurality of spaced, substantially planar heating elements attached to said cover in said cavity to be offset from each of the at least one toasting slot, whereby said cover, upon assuming the first spatial relationship, displaces said heating elements away from said toasting slots for clear access thereto and whereby said cover, upon assuming the second spatial relationship, positions a heating element on each side of the at least one toasting slot, said base and cover, when in the second spatial relationship, forming a closed volume about said at least one toasting slot for establishing a toasting environment.

11. The toaster as recited in claim 10 wherein said relationship establishment means comprises hinge means attached to said cover and said base thereby to allow said cover to pivot thereby to establish the first and second spatial relationships.

12. The toaster as recited in claim 11 additionally comprising means for biasing said cover to an open position thereby to establish the first spatial relationship.

13. The toaster as recited in claim 11 additionally comprising latch means for retaining said cover in said closed position thereby to maintain said second spatial relationship.

14. The toaster as recited in claim 10 wherein each of said heating elements includes a planar support that carries a heating wire and wherein a rigid barrier overlies the edge of each planar support proximate the open side of said cover.

15. The toaster as recited in claim 10 wherein said cover includes vents aligned with the basket assemblies for controlling the moisture during the toasting process while reducing the escape of radiant and convective energy.

16. The toaster as recited in claim 10 wherein each of said side panels includes a pair of downwardly extending pins and said cover motion responsive adjusting means includes:
  i) a pivot plate attached to said base having a plurality of apertures for receiving said side panel pins for supporting each of said side panels for pivotal movement,
  ii) a cam plate positioned proximate said pivot plate and having means for applying to the ends of each said pins a force component perpendicular to said side panels, and
  iii) means attached to said cover for reciprocating said cam plate during the opening and closing of said cover thereby displacing the ends of said pins laterally and pivoting said side panels.

17. The toaster as recited in claim 16 additionally comprising means attached to said pivot and cam plates for biasing said carriage to a retracted position.

* * * * *